(12) United States Patent
Hall

(10) Patent No.: US 7,419,063 B1
(45) Date of Patent: *Sep. 2, 2008

(54) NESTABLE AND LIFTABLE OVEN RACK

(75) Inventor: Donald M. Hall, Mt. Sinai, NY (US)

(73) Assignee: M & E Manufacturing Company, Inc., Kingston, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/836,401

(22) Filed: May 3, 2004

Related U.S. Application Data

(63) Continuation-in-part of application No. 10/195,411, filed on Jul. 16, 2002, now Pat. No. 6,974,042, which is a continuation-in-part of application No. 08/847,483, filed on Apr. 25, 1997, now Pat. No. 6,419,098, said application No. 10/836,401 is a continuation-in-part of application No. 10/183,565, filed on Jun. 28, 2002, now abandoned.

(60) Provisional application No. 60/034,853, filed on Jan. 28, 1997, provisional application No. 60/017,343, filed on Apr. 26, 1996.

(51) Int. Cl.
*A47F 3/14* (2006.01)
(52) U.S. Cl. ............... 211/133.1; 211/126.1; 211/41.3; 280/33.997
(58) Field of Classification Search ............ 211/133.1, 211/41.2, 41.3, 126.1; D34/14, 21, 23; 108/143, 108/91, 177; 280/33.997, 33.998, 33.995, 280/33.991
See application file for complete search history.

(56) References Cited

U.S. PATENT DOCUMENTS

| | | | |
|---|---|---|---|
| 912,035 A | 2/1909 | Schaefle | |
| 1,691,621 A | 11/1928 | Young | |
| 2,622,740 A | 12/1952 | Evers | |
| 2,838,198 A | 6/1958 | Vidal | |
| 2,928,681 A | 3/1960 | Wilson | |
| 2,959,298 A | 11/1960 | Pope | 211/126.15 |

(Continued)

OTHER PUBLICATIONS

*Baxter Catalog, Stainless Oven Racks/Rondo & Elektro Dahlen Ovens* (printed in U.S.A Nov. 1, 1995), p. CT8.

(Continued)

*Primary Examiner*—James A. Kramer
*Assistant Examiner*—Jared W. Newton
(74) *Attorney, Agent, or Firm*—Shlesinger, Arkwright & Garvey LLP.

(57) ABSTRACT

Rack includes a left upright frame, a right upright frame, and a connector extending between and joining the left and right frames. The connector defines at least one passage extending along the left upright frame, for example, so that another rack may be nested within a volume defined by the rack for reducing storage space requirements. The rack may have its connector oriented so that the rack has a substantially Z-shaped frame, a substantially X-shaped frame, a substantially U-shaped frame, a substantially V-shaped frame, or a substantially H-shaped frame, for example, when viewed from above. A lifting element may be provided on an upper portion of the rack for use with institutional and industrial lifting mechanisms. The lifting element may be mounted on the rack so as to avoid interference with another rack when the racks are nesting.

16 Claims, 14 Drawing Sheets

U.S. PATENT DOCUMENTS

| | | | |
|---|---|---|---|
| 2,962,167 A | 11/1960 | Storey et al. | |
| 2,982,422 A | 5/1961 | Asproyerakas | |
| 2,992,010 A | 7/1961 | Sides | |
| 3,199,683 A | 8/1965 | Graswich | |
| 3,240,505 A * | 3/1966 | Schlernitzauer | 280/651 |
| 3,248,077 A | 4/1966 | Charles | |
| 3,272,528 A | 9/1966 | Young et al. | |
| 3,303,938 A * | 2/1967 | Solomon | 211/182 |
| 3,424,315 A | 1/1969 | Farren | |
| 3,527,359 A | 9/1970 | Lambertson | |
| 3,533,513 A | 10/1970 | Berman | |
| 3,567,039 A | 3/1971 | Evans | |
| 3,580,602 A | 5/1971 | Hebert | |
| 3,595,178 A | 7/1971 | Dahlen | 432/241 |
| 3,844,600 A | 10/1974 | Jay | |
| 3,874,689 A | 4/1975 | Morgan | |
| 3,912,086 A | 10/1975 | de Bruyn | |
| 3,981,510 A | 9/1976 | Gustafsson | |
| 4,004,819 A | 1/1977 | Brongo | 280/79.3 |
| 4,008,671 A * | 2/1977 | Baldini | 108/177 |
| 4,266,509 A | 5/1981 | Gollott et al. | 119/208 |
| 4,346,906 A | 8/1982 | Thorpe | |
| 4,349,213 A | 9/1982 | Hirsch | |
| 4,456,273 A | 6/1984 | McKinnon | |
| 4,509,652 A | 4/1985 | Arney | 211/126.15 |
| 4,616,754 A | 10/1986 | Heinzl et al. | 211/71.01 |
| 4,788,741 A | 12/1988 | Hilborn | |
| 4,998,023 A | 3/1991 | Kitts | |
| 5,016,765 A | 5/1991 | Leonardo | |
| 5,123,550 A | 6/1992 | Nadskov et al. | |
| 5,125,520 A | 6/1992 | Kawasaki | |
| 5,269,112 A | 12/1993 | Weinrub et al. | |
| 5,330,060 A | 7/1994 | Bohner | |
| 5,330,064 A * | 7/1994 | Hall | 211/182 |
| 5,370,239 A | 12/1994 | Kidaloski et al. | |
| 5,579,930 A | 12/1996 | Brendle | |
| 5,628,280 A | 5/1997 | Ericsson | 119/239 |
| 5,685,442 A | 11/1997 | Yoshino et al. | 211/201 |
| D409,811 S | 5/1999 | Hutchinson | D34/21 |
| 5,957,309 A * | 9/1999 | Hall | 211/126.2 |
| 6,203,035 B1 | 3/2001 | Ondrasik | |
| 6,419,098 B1 | 7/2002 | Hall | 211/133.1 |
| 6,974,042 B2 * | 12/2005 | Hall | 211/133.1 |

OTHER PUBLICATIONS

*Baxter Catalog, Stainless Oven Racks/Adam & Revent Ovens* (printed in U.S.A. Nov. 1, 1995), p. CT9.

*Baxter Catalog, Stainless Oven Racks/For Baxter Advantage 2 Ovens—fits 18"×26" pans* (printed in the U.S.A. Feb. 1992), Form CT 11 (one page).

* cited by examiner

NESTABLE AND LIFTABLE OVEN RACK

CROSS-REFERENCE TO RELATED APPLICATIONS

This application is a continuation-in-part of application Ser. No. 10/195,411, filed Jul. 16, 2002 now U.S. Pat. No. 6,974,042, which application Ser. No. 10/195,411 is a continuation-in-part of application Ser. No. 08/847,483, filed Apr. 25, 1997, now U.S. Pat. No. 6,419,098, issued Jul. 16, 2002, and which claims the priority of provisional application No. 60/034,853, filed Jan. 28, 1997, entitled "Nestable and/or Liftable Rack", and which claims the priority of provisional application No. 60/017,343, entitled "Nesting Oven Racks Equipped with Brackets for Lifting the Rack", filed Apr. 26, 1996, and each of which is incorporated herein by reference.

This application is a continuation-in-part of Applicant's co-pending application Ser. No. 10/183,565, filed Jun. 28, 2002 now abandoned, entitled "V-Shaped Nestable Tray Rack", which is incorporated

FIELD OF THE INVENTION

This invention relates to a rack.

More particularly, this invention relates to a rack suited for holding and supporting objects.

Specifically, the invention relates to a rack configured for nesting with other like racks.

Still further, the invention relates to a rack which not only nests with other racks, but may also be lifted up from above by conventional lifting equipment found in commercial ovens, for example.

BACKGROUND OF THE INVENTION

Known racks are expensive to manufacture, unsuited for various applications, require lots of storage space, are expensive to transport owing to their box-like, non-nestable configuration, and, heretofore, no nestable rack has been known that is both nestable and can likewise be lifted from above.

In one earlier patent, U.S. Pat. No. 5,330,064 to Hall for "Support Assembly for a Holding Rack" discloses a Z-shaped holding rack 320 in FIG. 6 thereof that works well as a rack; yet, the present invention works even better and is particularly suited for lifting by a lifting mechanism.

Liftable oven racks are known.

Nestable racks are known.

Yet, prior to the present invention no one had ever developed a nestable, liftable oven rack.

OBJECTS AND SUMMARY OF THE INVENTION

Accordingly, it is an object of the invention to provide a rack which overcomes the drawbacks and disadvantages of prior art devices.

Another object of the invention is to provide a rack which is easily and inexpensively manufactured, requires less storage space than conventional racks, is strong, may be readily made in a knock-down form, can be constructed using less expensive materials than known racks, is easier for users to use, and/or can be provided with lifting elements (such as runners/c-channels) on the top thereof for engaging with conventional lifting equipment.

A further object of the invention is to provide a liftable rack which is as strong as conventional liftable racks, even though it has the advantageous nesting capability of a substantially Z-shaped rack.

A still further object of the invention is to provide a rack which can be factory assembled, and shipped cost-effectively assembled, owing to the reduced volume required by each nested rack. Such leads to significant cost and energy savings.

Yet another object of the invention is to provide a rack which advantageously exploits the properties of the material used to construct the rack to yield a rack best suited to the desired maximized properties of the rack; i.e., whether the desired property be a maximization of the low weight of the finished product, the side-loading strength of the rack, the lifting capacity of the rack, or a melding of any of the above-described properties.

A further object of the invention is to provide a Z-shaped rack (when viewed from above) which nests, yet is as strong as non-nesting racks and as the intended use demands.

A still further object of the invention is to improve upon the earlier, above-named related racks, to achieve better solutions to the above-described problems.

In summary, the invention includes a previously unknown nestable, liftable oven rack.

In summary, it will be seen that the above objects have been met while achieving high nesting density of nested racks.

The attached figures illustrate various preferred embodiments of the invention.

Relative terms such as "upper", "lower", "left", and "right" are used for ease of understanding, and are not intended to be limiting.

It will be appreciated that relative terms such as up, down, left, and right are for convenience only and are not intended to be limiting.

DETAILED DESCRIPTION OF THE INVENTION

FIGS. 1-2

Figure 1:
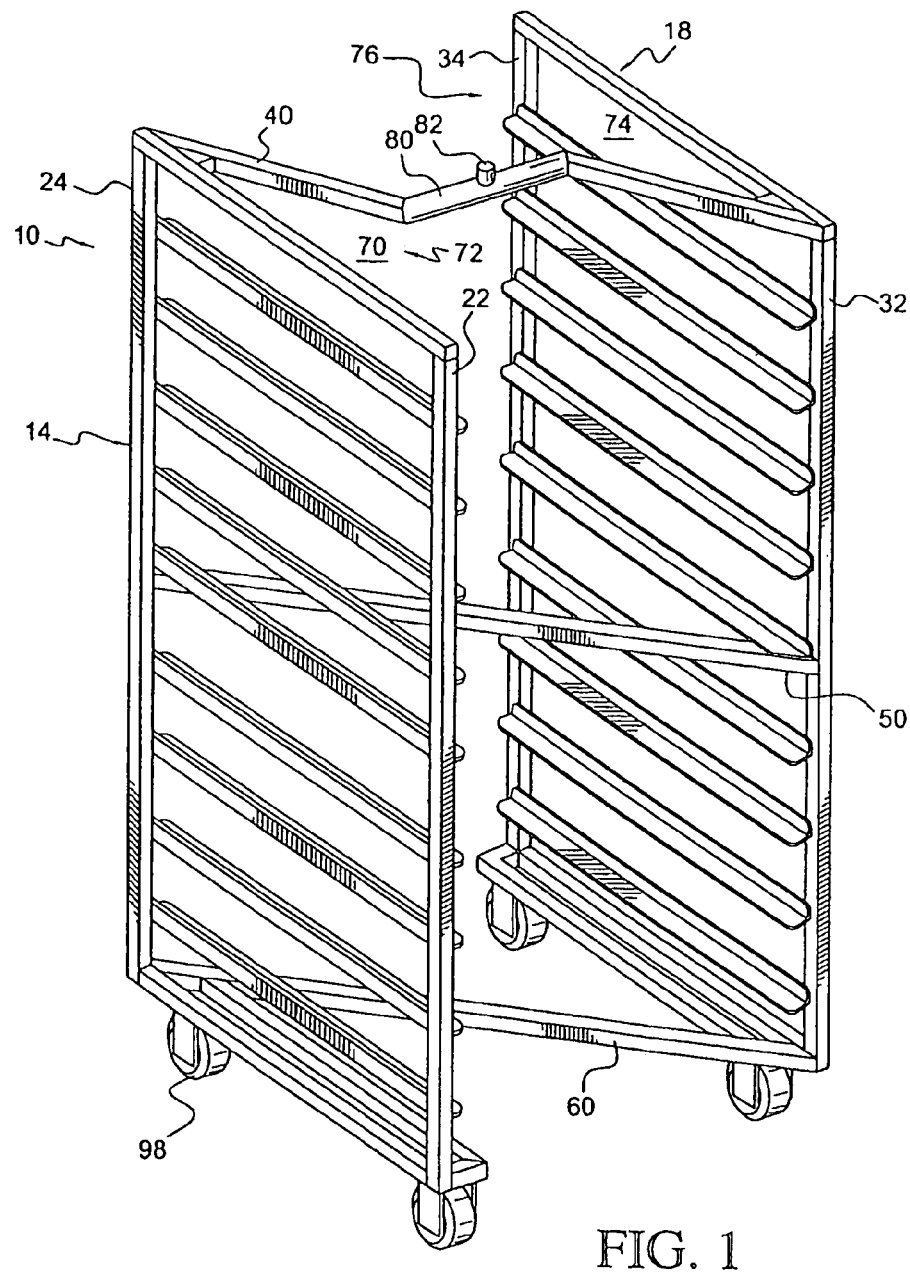
FIG. 1 is a front perspective view of a rack according to a preferred embodiment of the invention.
Figure 2:
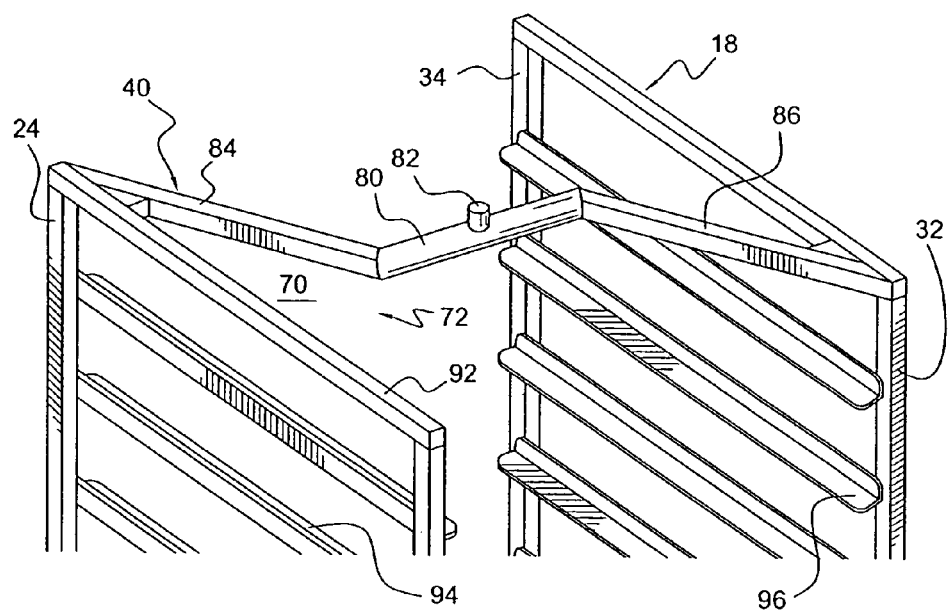
FIG. 2 illustrates an upper portion of the preferred embodiment of FIG. 1, taken on an enlarged scale.

FIGS. 1-2 illustrate a first preferred embodiment of the invention.

A rack 10 includes a left upright frame 14 and a spaced apart right upright frame 18.

Left frame 14 includes a left front post 22 and a left rear post 24, and said front and rear posts 22, 24 being connected by an upper member and a lower member, respectively, to form a generally rectangular frame. Likewise, right upright frame 18 includes a right front post 32 and a right rear post 34, and said front and rear posts 32, 34 being connected by an upper member and a lower member, respectively, to form a generally rectangular frame. The upper members of the respective left and right frames may likewise be termed top left and top right frame connectors, as set forth below regarding FIG. 8, for example.

An upper connector 40 connects left frame 14 to right frame 18. Typically, upper connector 40 may be made of square tubing, and bolted, or welded, to left and right frames 14, 18, respectively.

A middle connector 50 may be provided for added strength.

In a similar fashion, a lower connector 60 may be provided at the bottom of rack 10. The left upright frame, the lower connector, and the right upright frame defining a substantially Z-shaped frame.

A left passage 70 having a mouth 72 is defined at an upper portion of rack 10 for receiving at least one of left rear posts 24 and right front posts 32 of another rack 10, when rack 10 and another rack 10 are nested together. That is, when two racks 10 have been pushed together so as to reduce the amount of space required for storing racks 10 when not in use.

There may likewise be provided a right passage 74 having a mouth 76 defining the entrance thereof.

In a case where both left passage 70 and right passage 74 are provided, as shown in the preferred embodiment of FIGS. 1-2, it is possible to nest multiple racks 10 together in the manner illustrated schematically in FIG. 4, as will be even more apparent from the detailed description under operation below.

Still further, a lifting element 80 may be provided on rack 10.

Preferably, lifting element 80 is provided between left upright frame 14 and right upright frame 18. As illustrated, lifting element 80 may be in the form of a round tube or piece of solid steel bar stock. A stainless steel exterior covering or cladding may be provided to encase lifting element 80 when solid steel bar stock (e.g. carbon steel stock) is used.

Typically, there will be provided a guide member 82 disposed on lifting element 80. Guide member 82 may be stainless steel, or stainless steel-clad steel bar stock.

Both lifting element 80 and guide member 82 may be configured for mating with conventional lifting equipment, such as used in bakery operations.

Still further, upper connector 40 may be divided into a left arm 84 and a right arm 86 joined together by lifting element 80. It will be appreciated that left arm 84, along with a portion of a sub-member 92 of left frame 14, jointly define passage 70. Left and right arms 84, 86 may be made of double tubes or double-walled tubing.

When there are items to be supported by rack 10 such as flat trays or bakery pans, one or more runners 94, 96, may be provided on right and left frames 18, 14, respectively.

One or more casters 98 may be provided at a lower portion of rack 10 to ease movement thereof.

FIG. 3

Figure 3:
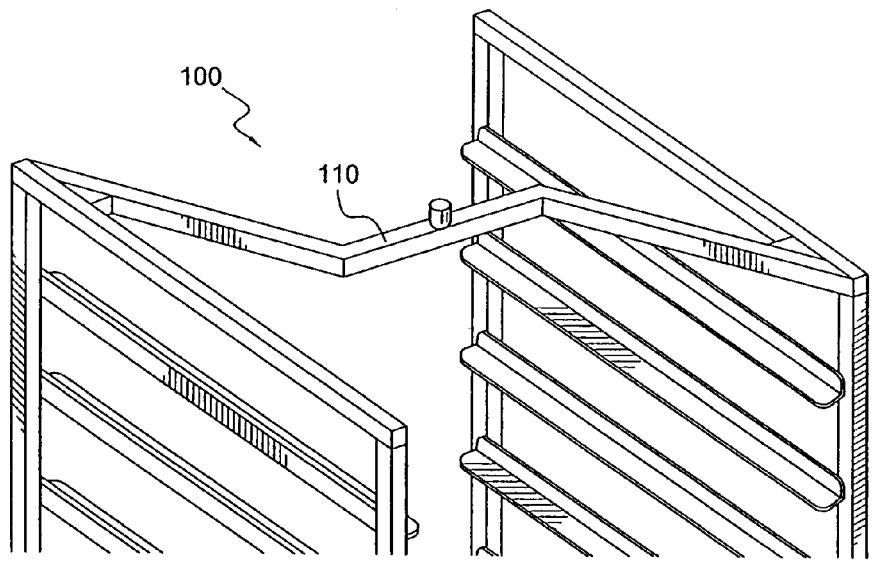
FIG. 3 is a view similar to FIG. 2, of a further preferred embodiment of a rack according to the invention.

FIG. 3 illustrates another preferred embodiment of a rack 100 in which a lifting element 110 is made of square stock, as opposed to the round or circular lifting element 80 of the embodiment of FIGS. 1-2, for example.

FIG. 4

Nesting of the racks of FIGS. 1-2 and FIG. 3 is described in detail below under OPERATION.

FIGS. 5-7

Figure 6:
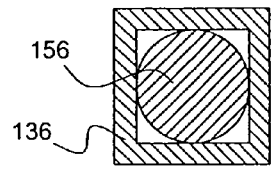
FIG. 6 is a cross-sectional view of a connecting element, taken along lines 6-6 of the preferred embodiment of FIG. 5.
Figure 7:
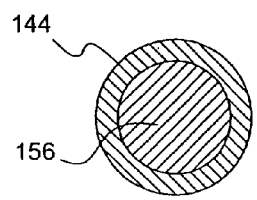
FIG. 7 is a cross-sectional view of a lifting element, taken along lines 7-7 of the preferred embodiment of FIG. 5.
Figure 5:
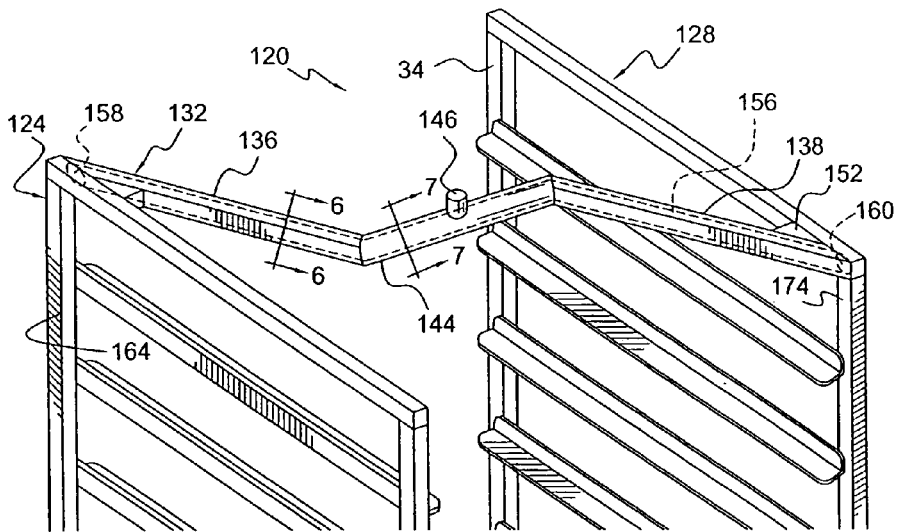
FIG. 5 is a view similar to FIG. 3, illustrating another preferred embodiment of a rack according to the invention.

Turning to FIGS. 5-7 a still preferred embodiment of the invention will be described.

A nesting rack 120 includes a left frame 124 and a right frame 128 with an upper connector 132 extending therebetween.

Upper connector 132 may be provided with a left connector element 136 and a right connector element 138 joined by a lifting element 144 in the case where rack 120 is to be used with the lifting mechanism in a bakery operation, for example.

A guide element 146 may be provided on lifting element 144 for assisting in positioning lifting element 144 and rack 120, in use.

When additional strength is required, for example, one or more gussets 152 may be provided between right frame 128 and right connector element 138, as illustrated.

Good results have been achieved when a solid round steel insert 156 is bent, as required, extends substantially the entire distance between left frame 124 and right frame 128 for strengthening the overall construction of rack 120.

Left connector element 136 and lifting element 144 may include an exterior stainless steel weldment or sheath, as may be likewise appreciated from FIGS. 6 and 7. Such stainless steel sheath, for example, is particularly desirable when rack 120 is intended for use in the food industry, institutions such as hospitals, and like applications where exterior services must be readily sanitized or rust-free.

FIG. 6 illustrates how left connector element 136 may be made of square tubing, for example, while still enclosing insert 156 having a diameter such that insert 156 snuggly engages the interior walls of the illustrated square exterior portion of left connector element 136 at least four (4) "points" of contact.

FIG. 7 illustrates the manner in which lifting element 144 is preferably constructed of an exterior round tubing sized so that the interior wall of such round tubing snugly engages substantially the entire circumference of round insert 156.

Guide element 146 will also typically be constructed of stainless steel or like material when used in demanding environments such as bakeries and in the restaurant industry.

It will be noted that the left free end 158 and right free end 160 of insert 156 are preferably configured and disposed so that each smoothly abuts and engages a left rear post 164 of left frame 124, and a right front post 160 of right frame 128, respectively.

The use of additional middle and lower connectors, wheels, such as casters, and like elements, is contemplated for the embodiment of FIG. 5-7.

Good results have been achieved when insert 156 was made of a solid steel insert extending the entire length from left rear post 164 to front right post 174, where stainless steel tubing was used for left connecting element 136 and right connecting element 138, and round stainless steel tubing was used for at least the exterior member of lifting element 144.

Connector element 136 is shown as square tubing covering round insert 156.

Round stainless steel tubing is shown covering the round insert 156 extending through lifting element 144.

In such a case, stainless steel welds may be used for joining the intersection between the round stainless steel tubing of lifting element 144 and the square stainless steel tubing of left connector element 136, as well as the analogous intersection between the stainless steel exteriors of lifting element 144 and right connector element 138.

The operation of the embodiment of FIGS. 5-7 is analogous to the operation of the above-described preferred embodiments.

FIGS. 8-10

Figure 8:
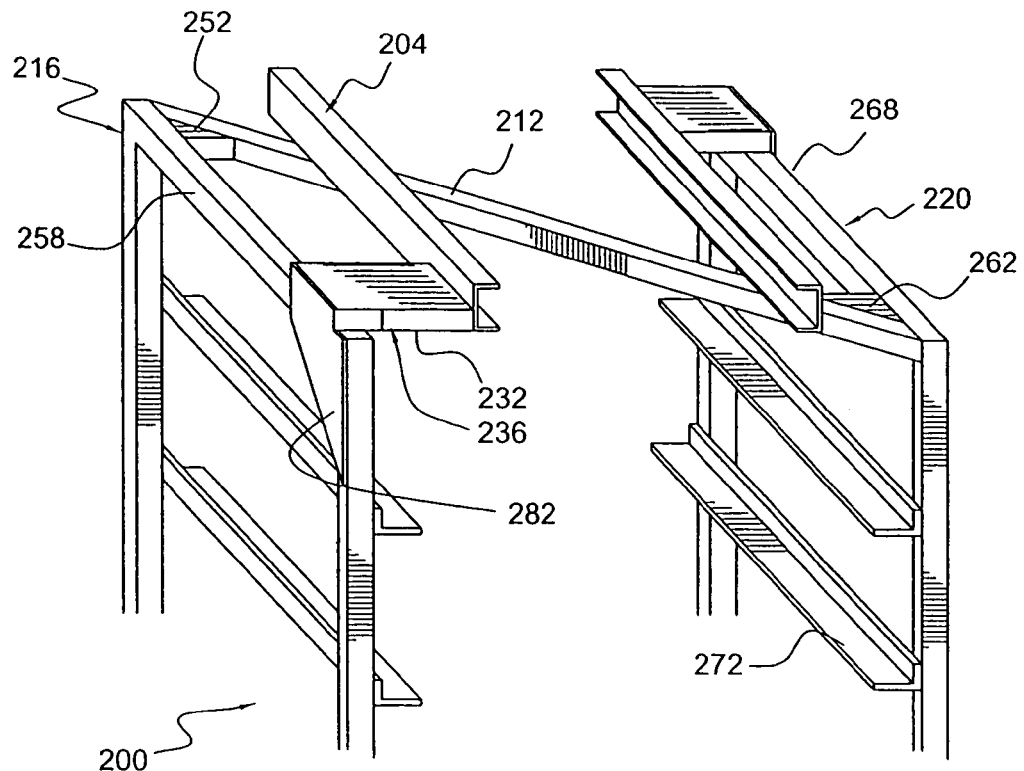
FIG. 8 is a partial, front perspective view of another preferred embodiment of a rack according to the invention.
Figure 10:
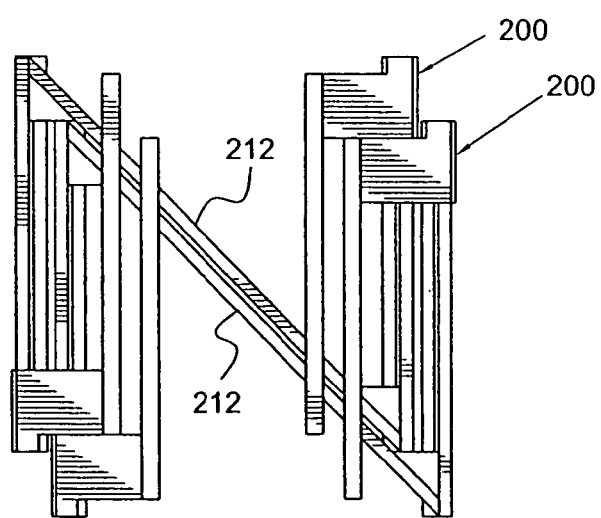
FIG. 10 illustrates the nesting of two (2) racks of the preferred embodiment of FIGS. 8-9.

The preferred embodiment of FIGS. 8-10 is a nesting Z-style oven rack 200 that is lifted from the top.

The rack 200 that is pictured fits one particular style and make of oven.

Such oven racks are used in many high volume bakeries such as are common to the supermarket and food service industry. Some oven racks are designed to be lifted while they are in the oven, others rest on the casters on which they are mounted for ease of movement. There are many different styles of lift mechanisms, and each different oven manufacturer may offer more than one style of lift for their ovens. It is contemplated that the lifting elements, rack configuration, and the like will be varied depending on the lifting mechanism requirements.

In order to achieve maximum nestability, a "C" channel 204 mounted to the top of the rack 200, which channel 204 the lifting device in the oven engages, must not interfere when two or more racks 200 are engaged by nesting them together. That is particularly difficult since "C" channel 204 must also be designed and attached to the rack in such a way that it is able to support the weight of rack 200, including the oven trays and the baked goods that commonly fill the rack during the bake cycle. This weight can be considerable, especially when a double oven rack is utilized.

Many of the oven racks that require a mechanical structure for the ovenlifting device to engage have a general configuration that is similar to the rack shown here, thus one can readily appreciate that this design can be easily adapted to most of the oven racks that require such structures.

As discussed above, "C" channel 204 must not interfere when the racks are nested. As will be appreciated, there are many other configurations for elements that can be lifted by the lifting mechanism of an oven rack, which elements are acceptable substitutes for "C" channels 204, as discussed above regarding the other embodiments, and which come within the scope of the invention.

As to the feature that "C" channel 204 and equivalents do not interfere with the nestability of rack 200, it will likewise be appreciated that there are many alternate solutions which can achieve the same function. For example, when the rack lifting mechanism (not shown) requires more room around the element to be lifted (such as the illustrated "C" channel 204) then brackets 236 can be moved up or down, for example, as necessary.

Likewise, a middle connector 212 of the Z style rack can be moved up or down as required, for example.

As will be appreciated, a left upright frame 216, a right upright frame 220, and middle connector 212 define the general Z-shape of the rack depicted.

When one rack 200 is moved closer to, and abuts, another rack for nesting, such as in the nested formation shown in FIG. 10, elements of the rack other than the two "C" channels 204 of one rack 200 must not interfere with the "C" channels 204 of another rack 200 in order for nesting to be accomplished. For example, a lower face 228 of channel 204 as well as a lower face 232 of bracket 236 must be located above the plane containing a top face 244 of middle connector element 212.

A spacer 286 may be provided between lower space 228 of channel 204 and top space 244 of connector element 212. The spacer may strengthen and rigidify the connection between channel 204 and the remainder of rack 200.

A gusset 252 may be provided between middle connector 212 and a top left frame connector 258. An analogous gusset 262 may be provided for rigidifying the connecting intersection between right frame 216 and an upper right frame connector 268.

Good results have been achieved when one or more supports or rails 272 are provided on one or both left and right frames 216 and 220, respectively. When rack 200 is for use in a bakery, for example, supports 272 are configured to receive and support standard bakery trays.

Additional strengthening elements, such as the illustrated rigidifying member 282 may be provided, as desired.

FIGS. 9B-9E illustrates portions of rack 200 on an enlarged scale.

Figure 9A:
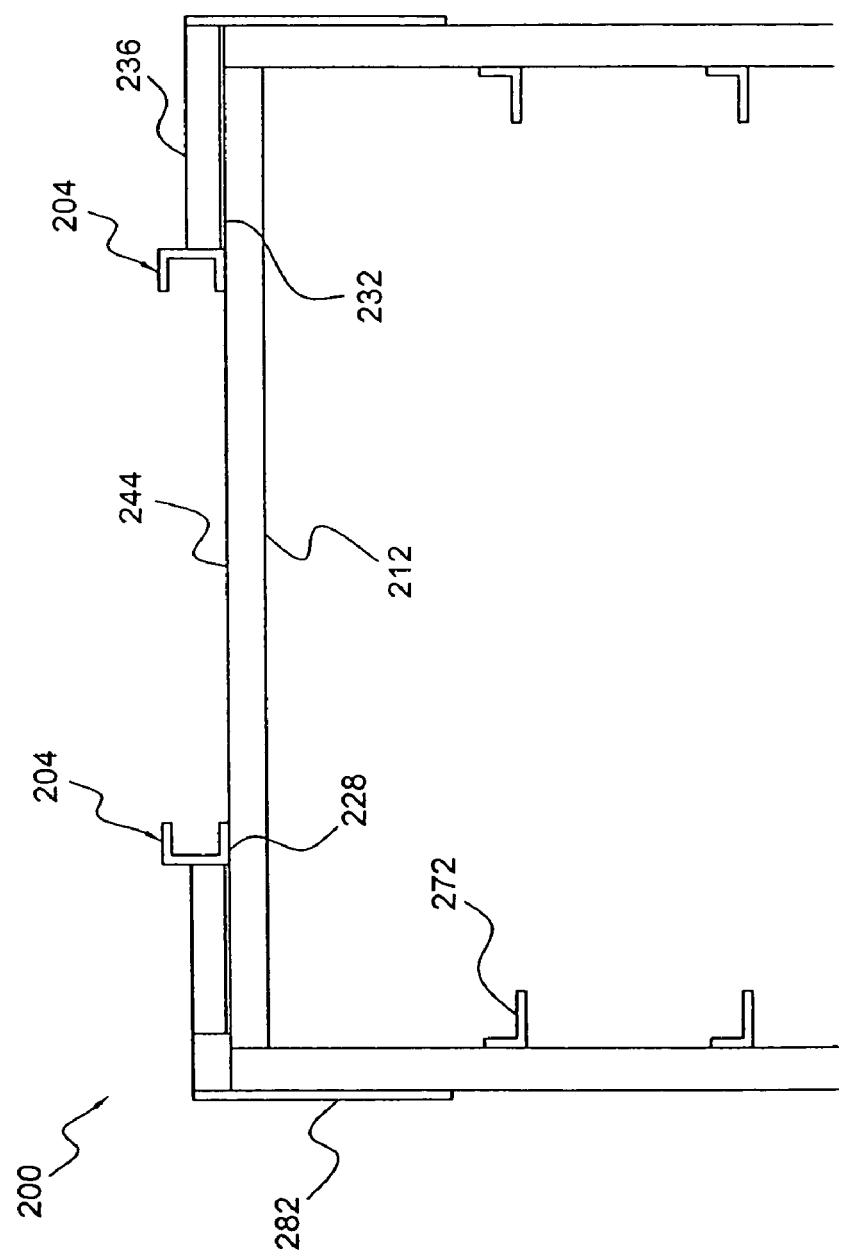
FIG. 9A is a front elevational view of the rack of FIG. 8.
Figure 9D:
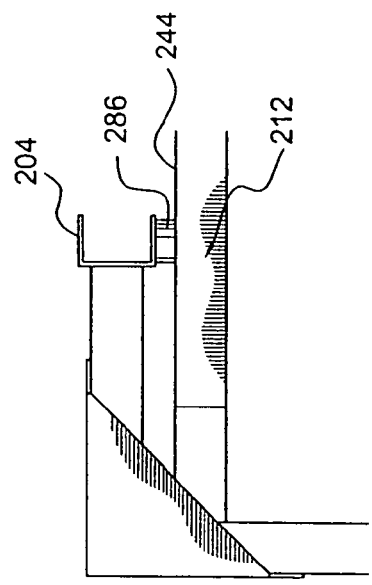
FIG. 9D shows a portion of the embodiment of FIGS. 8-10 on an enlarged scale.
Figure 9E:
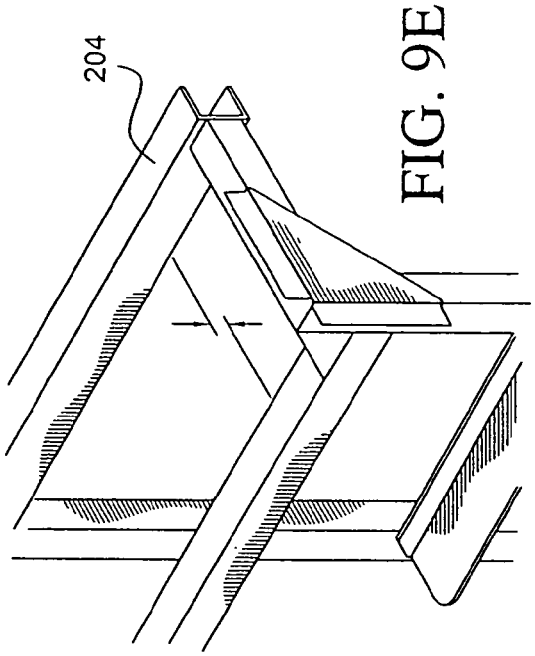
FIG. 9E shows a portion of the embodiment of FIGS. 8-10 on an enlarged scale.
Figure 9B:
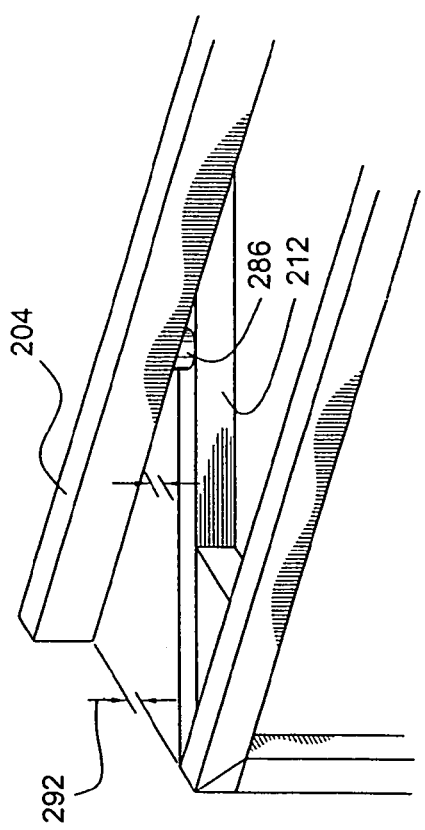
FIG. 9B shows a portion of the embodiment of FIGS. 8-10 on an enlarged scale.
Figure 9C:
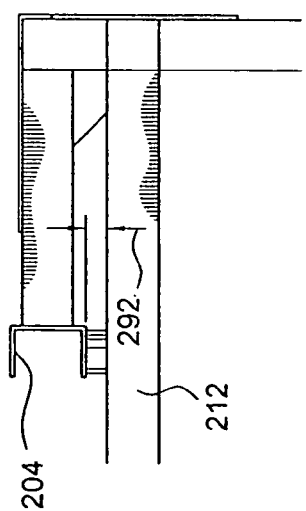
FIG. 9C shows a portion of the embodiment of FIGS. 8-10 on an enlarged scale.

FIG. 9B shows the provision of a spacer 286 which may be used to provide for a gap 292 between lifting element 204 and connector 212. Gap or offset 292 which is useful in the case of nesting two or more racks 200. Gap 292 ensures that the components mate without interference. The benefits of gaps 292 may be further appreciated by considering the discussion of the gap provided for by supports 330 of the embodiment of FIGS. 11 and 12 described in detail below.

It is likewise contemplated that other nestable racks, such as racks which are generally H-shaped, U-shaped, V-shaped, and X-shaped (as viewed from above) fall within the scope of the invention.

It will be readily appreciated that a variety of steels, stainless steels, metal alloys, aluminum, titanium, synthetic materials, and the like may be used to construct each of the disclosed racks, and all their components.

It is contemplated that the racks be shipped partially disassembled to the end user, and then assembled by bolting or welding together the components. Owing to the nestability of each of the embodiments of FIGS. 1-10, all described racks may be shipped fully assembled.

Thirty (30) racks may be shipped in the same volume required by fifteen (15) conventional, box-like racks, which yielded significant cost-savings.

OPERATION

Figure 4:
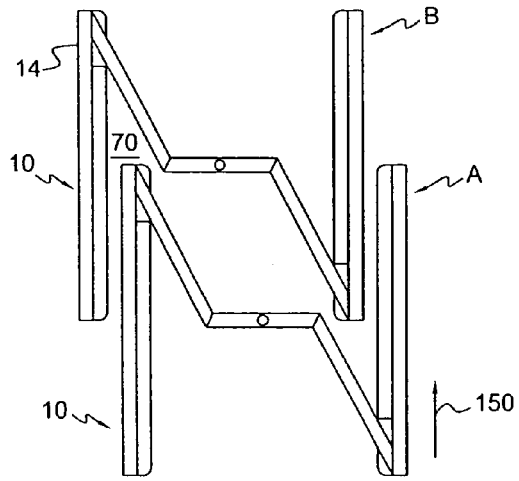
FIG. 4 illustrates schematically how the preferred embodiments of FIGS. 1-2 (and FIG. 3) nest for compact storage.

In use, the construction and operation of the preferred embodiments of FIGS. 1-2 and FIG. 3 will be readily appreciated when considering the process of nesting illustrated in FIG. 4.

Specifically, in a case where multiple racks are to be nested together, it is noted that the right front post 32 of a forward rack 10 ("A") will be inserted into left passage 70 of a rearward such rack 10 ("B") when two such racks 10 ("A" and "B") are to be nested, as shown in the direction of an arrow 150. See FIG. 4. In such case, the right passage 34 of the rack A which has been inserted into the rearward rack B, will have now been placed on the left side, as viewed in the figures, and the process of nesting will continue.

The embodiments of FIGS. 5-7 nest in a similar fashion to the nesting of the embodiments of FIGS. 1-3, as shown in FIG. 4.

FIG. 10 illustrates, schematically, two (2) nested frames 200. Note that gussets 252, for example were omitted for clarity.

In summary, it will be seen that at least the stated objects and goals of the invention have been met, and other unstated improvements over the prior art have been achieved.

For example, the preferred embodiments of FIGS. 1-10 have achieved the twin goals of providing a liftable rack, which is as strong as conventional racks, and which also may be compactly nested for reduced storage space requirements when not in use.

The embodiments of FIGS. 1-7 each have substantially Z-shaped frames, when viewed from above, the central lifting element which extends substantially perpendicularly to the planes containing the left and right frames yielding a somewhat jagged connector between the left and right frames that makes the appearance something other than a true Z shape.

Yet, those FIGS. 1-7 connectors provide for use of the invention with conventional lifting equipment, while maintaining overall strength, and providing the heretofore unknown compact nestability.

In use, when such racks are lifted by conventional ovens, and bakery products are being cooked thereon, the racks are typically grabbed by the central connectors, and rotated about a vertical axis passing through the guide element. Thus, strength is required as substantial forces are applied thereto.

The preferred embodiment of FIGS. 8-10 likewise achieves the goals of strength and nestability described immediately above, while maintaining a "truer" Z-shape that yields at least as much storage space savings as provided by the embodiments of FIGS. 1-7.

Figure 11:
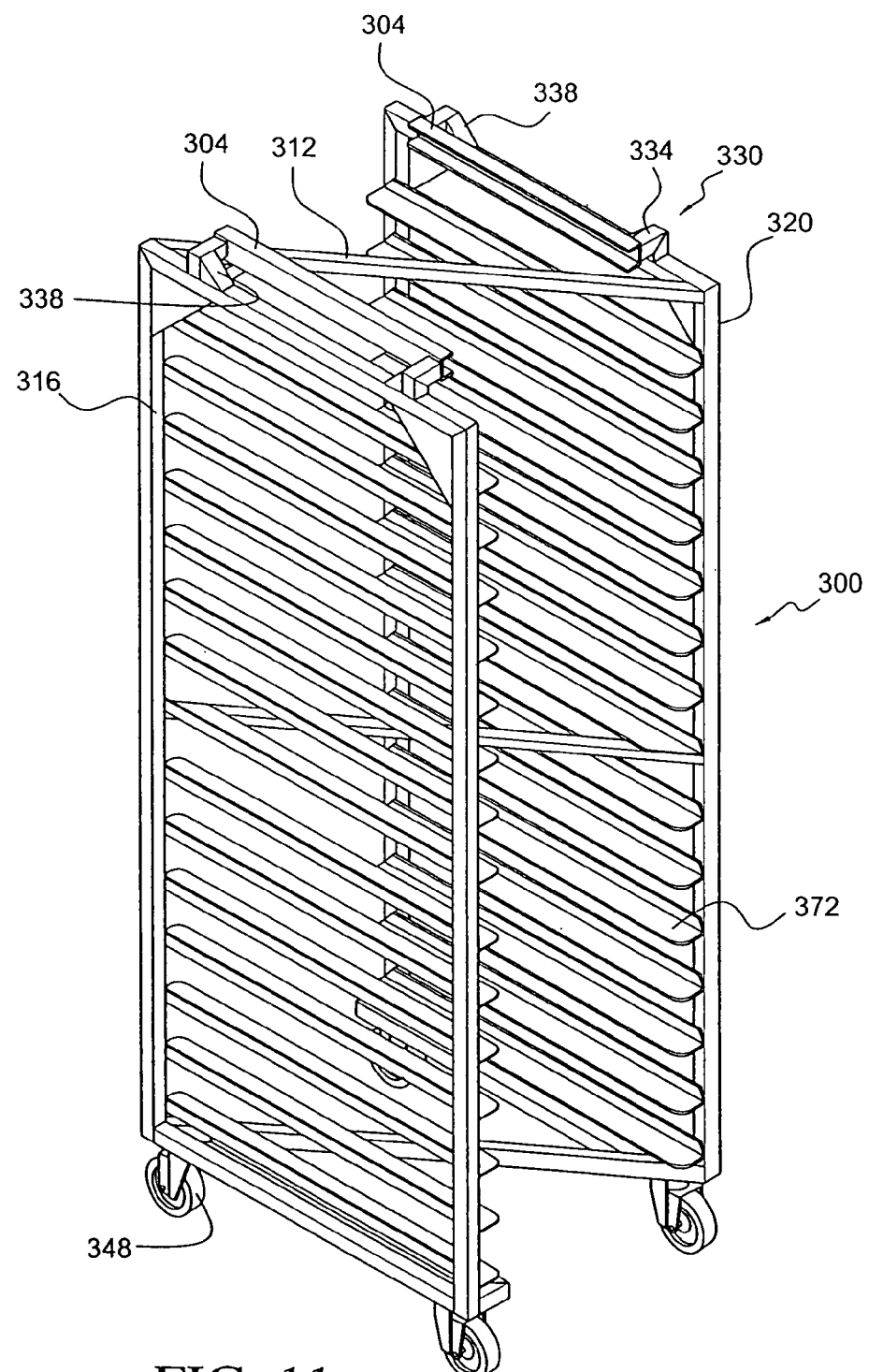
FIG. 11 shows a front perspective view of another rack according to the invention.
Figure 12:
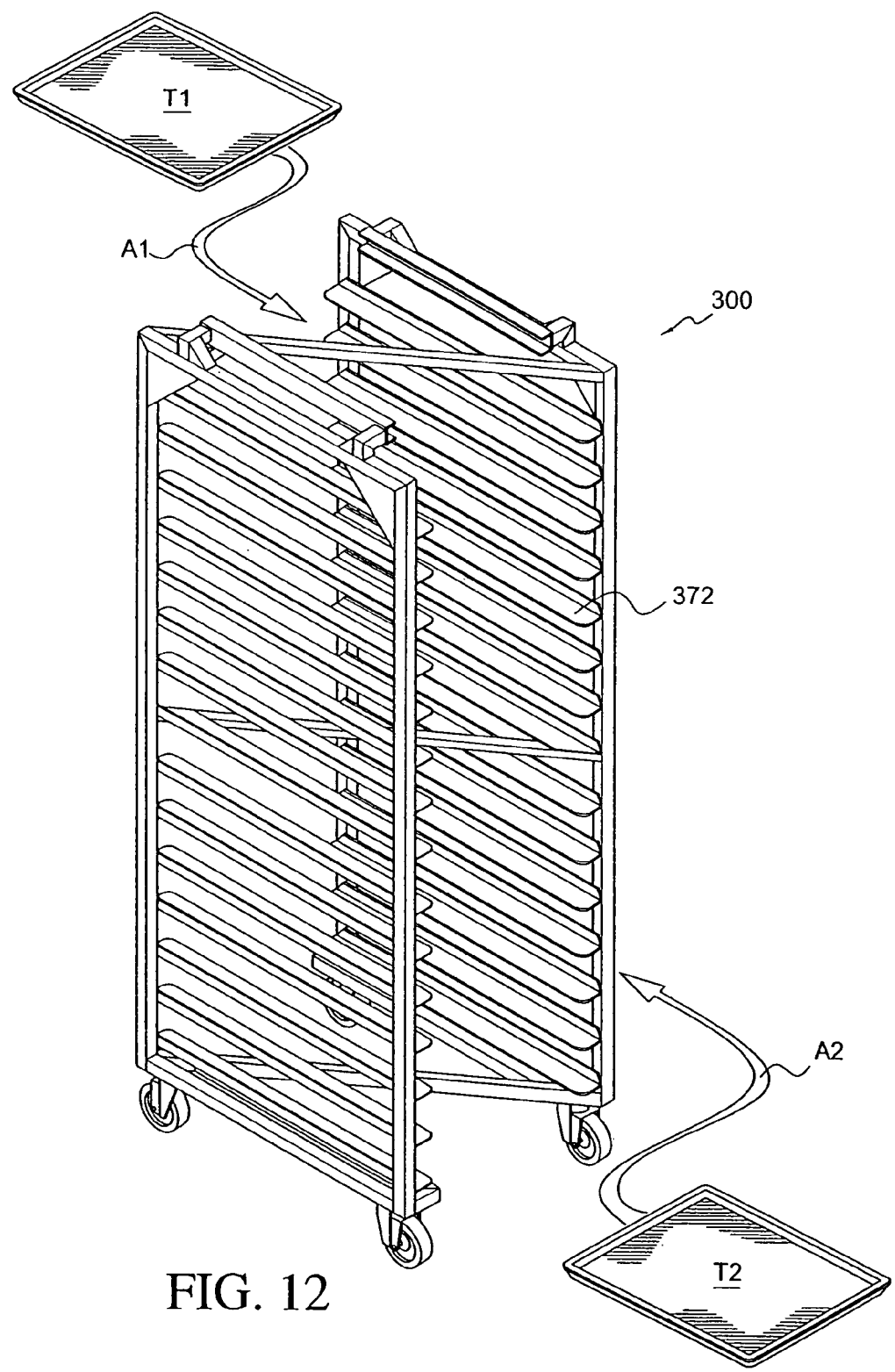
FIG. 12 is a perspective view of the rack of FIG. 11, in use.

FIGS. 11 and 12

FIGS. 11 and 12 illustrate another embodiment of a rack 300 according to the invention.

Rack 300 may include one or more lifting elements 304.

A middle connector 312 or connector 312 may be used to join a left upright frame 316 and a right upright frame 320 together, upright frames 316, 320, and middle connector 312 defining a substantially Z-shaped rack 300, as shown.

Lifting elements 304 may extend transversely to or substantially parallel with one or both of upright frames 316 and 320. Lifting elements 304 may be configured as C-channels, as shown, or as any other configurations which are suitable for being lifted by a lifting element.

Lifting element or channel 304 may be disposed above connector 312, such as being supported by one or more supports 330, which support 330 may include an L-shaped support leg 334. Support 330 may likewise include a strengthening and/or rigidifying element 338, such as a gusset or bracket which may extend from a portion of leg 334 to a portion of an associated one of upright frame 316 and 320, respectively.

In the case where rack 300 is carried on one or more wheels or casters 348, the elevation of lifting element 304 above connector 312 is useful. The provision of such a gap is useful when mating two or more racks, in the case where during the manufacturing process the height between the top of connector 312 and the supporting surface differs between two mating racks, in the case where the support surface, such as the floor of a store or warehouse is uneven, or in the case where casters 348 have become worn over time and the casters of one of a pair of mating racks, for example, have a smaller diameter and, hence, a shorter height than the newer casters 348 of a mating rack owing to such wear. This phenomenon has been described above in connection with the embodiment of FIGS. 8-10.

Lifting element 304 may be of different configurations, such as shown by the connectors of FIGS. 16-21, discussed below.

FIG. 12 illustrates the insertion of a tray T1 in the direction of an arrow A1 into the rear of rack 300. As will be readily apparent, tray T1 may be supported on supports or rails 372.

A further tray T2 may be inserted in the direction of an arrow A2 into the front of rack 300.

Depending on the size and configuration of trays T1 and T2, one or more of trays T1, T2 are supported on an opposed pair of supports or rails 372.

FIGS. 8-10 and 13

Figure 13:
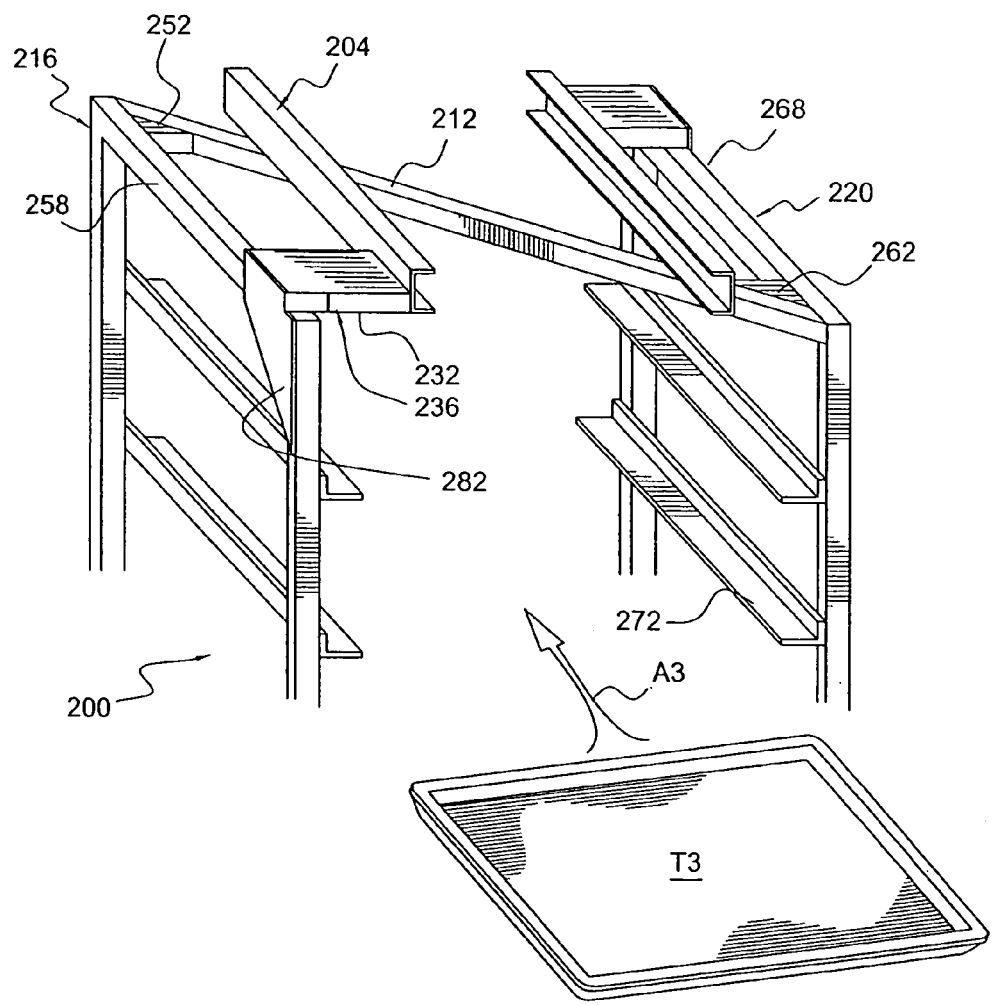
FIG. 13 is a view of the rack of FIG. 8, in use.

FIG. 13 illustrates the manner in which rack 200 receives and supports one or more trays T3 on rail 272, as shown by arrow A3.

In the case of the associated tray T3 having an extent substantially half that of the tray receiving region or "footprint" of rack 200, only 1 tray T3 would typically be accommodated, of course. In the case where unillustrated trays having a narrower width are used, two or more trays may be accommodated.

FIGS. 14-21

FIGS. 14-21 illustrate additional embodiments of lifting elements according to the invention.

Figures 14, 15:
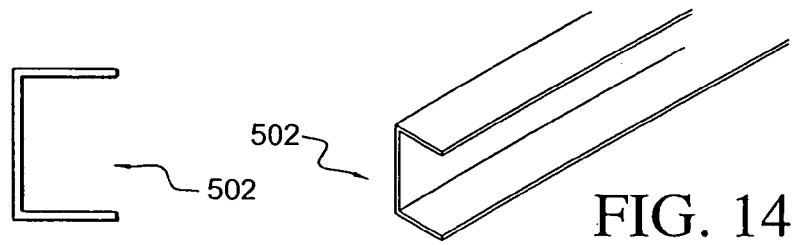
FIG. 14 is a perspective view of a lifting element according to the invention.
FIG. 15 is an end view of the lifting element of FIG. 14.

FIGS. 14 and 15 show a lifting element 502 configured as a C-channel.

Figures 16, 17:
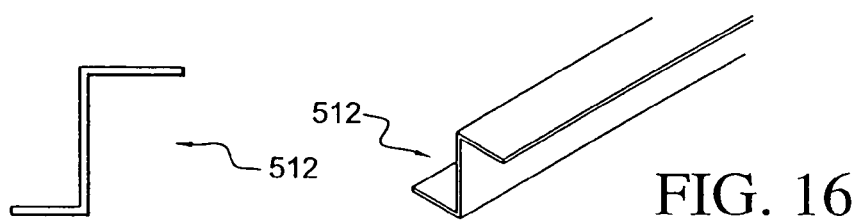
FIG. 16 is a perspective view of another lifting element according to the invention.
FIG. 17 is an end view of the lifting element of FIG. 16.

FIGS. 16 and 17 show a lifting element 512 configured as an S-channel.

Figures 18, 19:
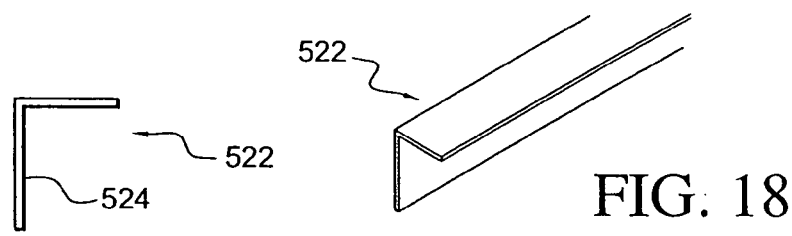
FIG. 18 is a perspective view of yet another lifting element according to the invention.
FIG. 19 is an end view of the lifting element of FIG. 18.

FIGS. 18 and 19 illustrate a lifting element 522 in the form of an L-channel.

Figures 20, 21:
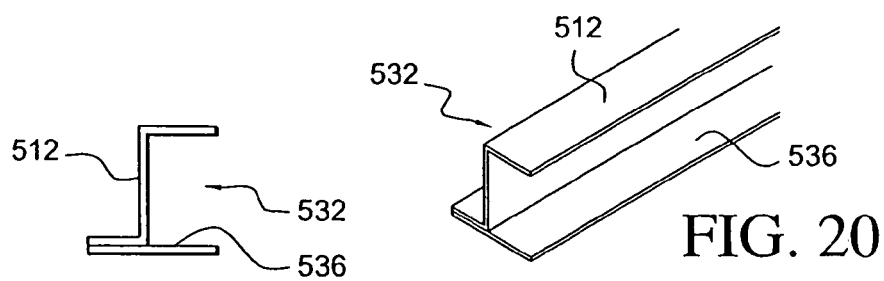
FIG. 20 is a perspective view of another lifting element according to the invention.
FIG. 21 is an end view of FIG. 20.

FIGS. 20 and 21 show a lifting element 532 in the form of an S-channel 512 which cooperates with a plate 536.

Each of the lifting element embodiments of FIGS. 14-21 may be appreciated by the considering the lifting elements described in connection with the embodiments of FIGS. 1-14.

It should be noted that in the case of L-channel lifting element 522 one of legs 524 may be attached to an upper portion of the rack on which is it used or to an outer face of the rack on which it is used. In use, L-channel 522 may be typically use in an inverted position with leg 524 attached to a portion of its associated rack.

FIGS. 22-30

FIGS. 22-30 schematically illustrate additional racks according to the invention.

Figure 22:
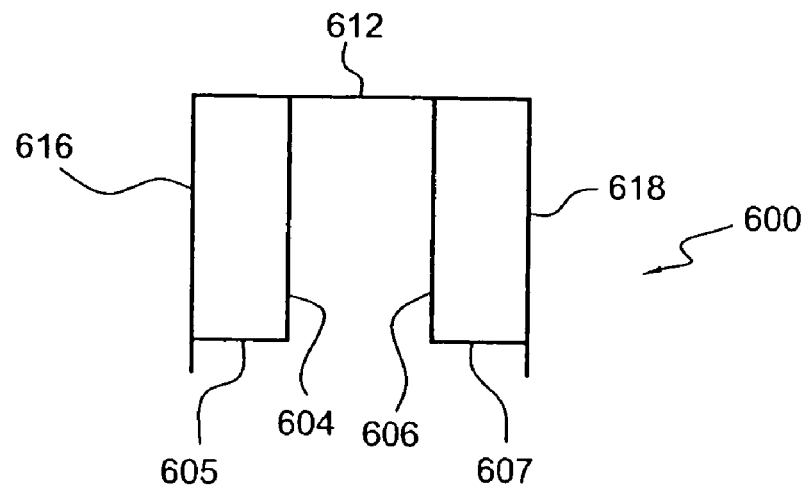
FIG. 22 is a schematic plan view of a U-shaped nestable, liftable oven rack according to the invention.
Figure 23:
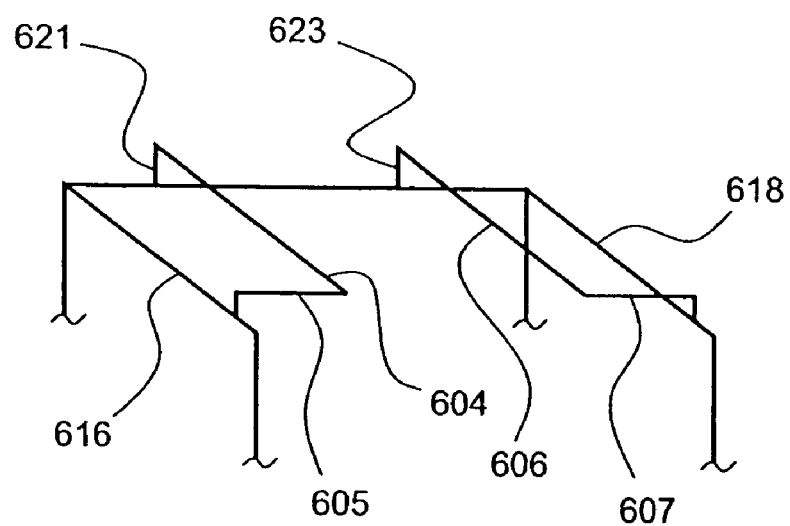
FIG. 23 is a perspective view of the nestable, liftable oven rack of FIG. 22.

FIGS. 22 and 23 show a U-shaped rack 600 according to the invention.

FIG. 22 is a plan view of U-shaped rack 600 which may include a left lifting element 604 and a right lifting element 606. Lifting elements 604, 606 may be supported, at least in part, by a connector 612, which may be an upper connector. As in the above-described embodiments, upper connector 612 may extend between and connect a left upright frame 616 and a right upright frame 618.

Spacing elements or spacers 607 and 609, which may be riser blocks, depending on the intended use, may be provided between one or both of the lifting elements 604, 606 and upper connector 612, and between one or both of left and right upright frames 616, 618 and upper connector 612. As in the above-described embodiments, depending on the intended use, one or both of lifting elements 604, 606 may be spaced above left frame 616 and right frame 618, so that, when nesting two or more frames, lifting elements 604, 606 avoid interfering in the nesting process. Spacing elements 607 and 609 may be L-shaped, as best seen in FIG. 23. Spacers 621 and 623 may likewise be L-shaped, or riser blocks, or be an extension of one or both of lifting elements 604 and 606, for example.

Figure 24:
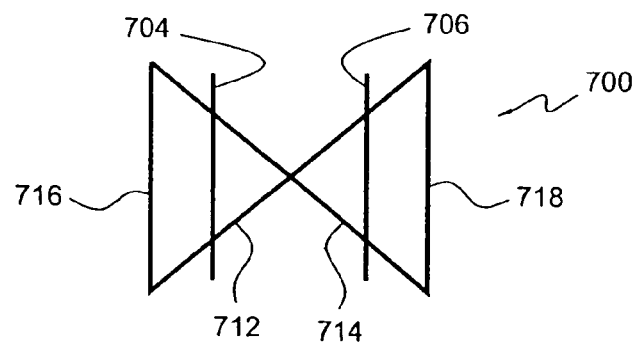
FIG. 24 is a schematic plan view of an X-shaped liftable, nestable oven rack according to the invention.

FIG. 24 illustrates an X-shaped liftable, nestable oven rack according to the invention including a left lifting element 704, a right lifting element 706, connectors 712 and 714, and left and right frame 716 and 718, respectively. Connectors 712 and 714 may be upper connectors. As in the above-described embodiments, appropriate space may be provided between lifting element 704 and connectors 712 and 714, and/or between lifting element 704 and one or both of left and right frames 716 and 718, depending on the intended use. In that manner, lifting elements 704 and 706 avoid interfering in the nesting process. For example, both lifting elements 704 and 706 may be spaced a sufficient distance above an upper portion of left and right frames 716 and 718, so that, when nesting, lifting elements 704 and 706 sufficiently freely pass above analogous upper connector 712 and 714 of a further X-shaped frame 700 so as to avoid interfering in the nesting process.

Figure 25:
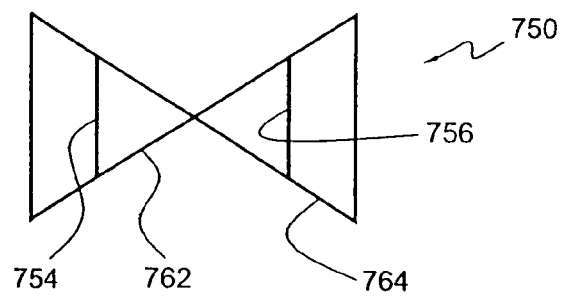
FIG. 25 is a schematic plan view of another X-shaped liftable, nestable oven rack according to the invention.
Figure 26:
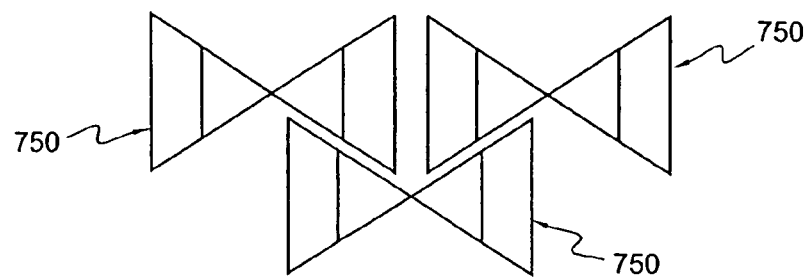
FIG. 26 is a schematic plan view of a number of liftable, nestable X-shaped oven racks of FIG. 25 shown as they are being nested.

FIG. 25 shows a rack 500 similar to rack 700, yet with lifting elements 754, 756 which do not extend past connectors 762, 764. In that manner, a user can achieve a degree of nesting which may suffice for the user. Rack 750 would require no spacers to achieve the degree of non-overlapping nesting shown in FIG. 26.

Figure 27:
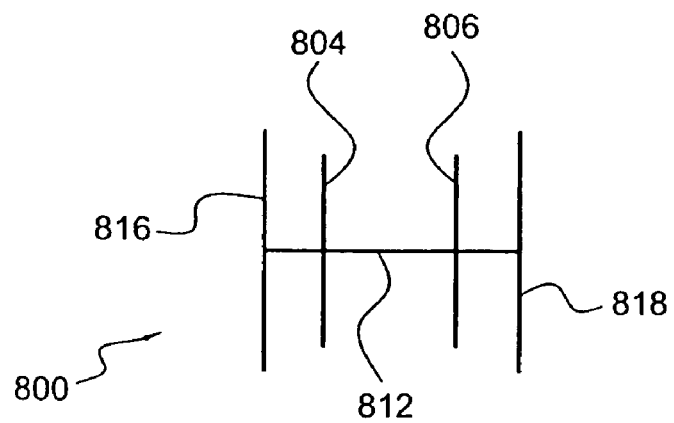
FIG. 27 is a schematic plan view of a liftable, nestable H-shaped oven rack according to the invention.

FIG. 27 illustrates a plan view of an H-shaped liftable, nestable oven rack 800, as described briefly above, which may include one or more lifting elements 804 and 806 supported by, for example, a connector 812. Connector 812 may be an upper connector extending between and connecting a left frame 816 and a right frame 818, as will be readily understood, based on a consideration of the other embodiments. The upper member of the left upright frame 816, the upper connector 812, and the upper member of the right upright frame 818 define an H-shaped frame which lies substantially in a plane. Again, upper connector 812 may be spaced sufficiently above one or both of left and right frames 816 and 818 so that, when nesting, another liftable, nestable oven rack 800 having analogous lifting elements 804 and 806 may be freely nested together, and the lifting elements 804 and 806 of the further nesting rack 800 may be sufficiently spaced above uppermost portions of left and right frames 816, 818, respectively, so that there is no interference during the nesting process. The spacing may be accomplished by providing a space in between one or both of left and right frames 816, 818 and upper connector 812, as in the above described embodiments. Quite simply, a spacer may be provided at the intersection of connector 812 and left frame 816, as well as at the intersection of upper connector 812 and right frame 818, as will be readily understood.

Figure 28:
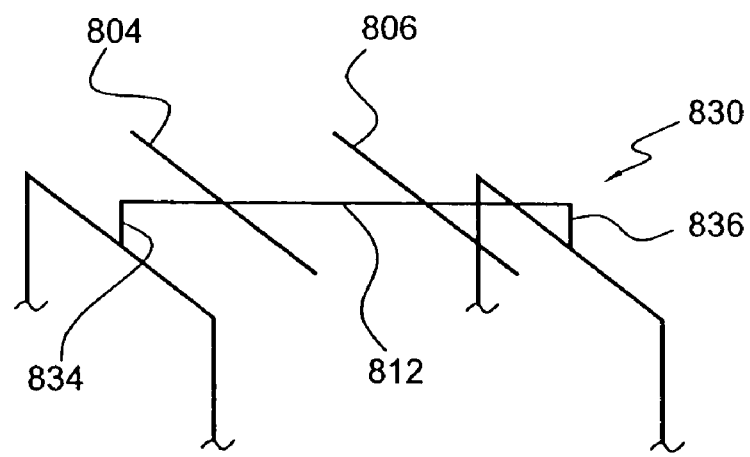
FIG. 28 is a schematic perspective view of the liftable, nestable H-shaped oven rack of FIG. 27.
Figure 29:
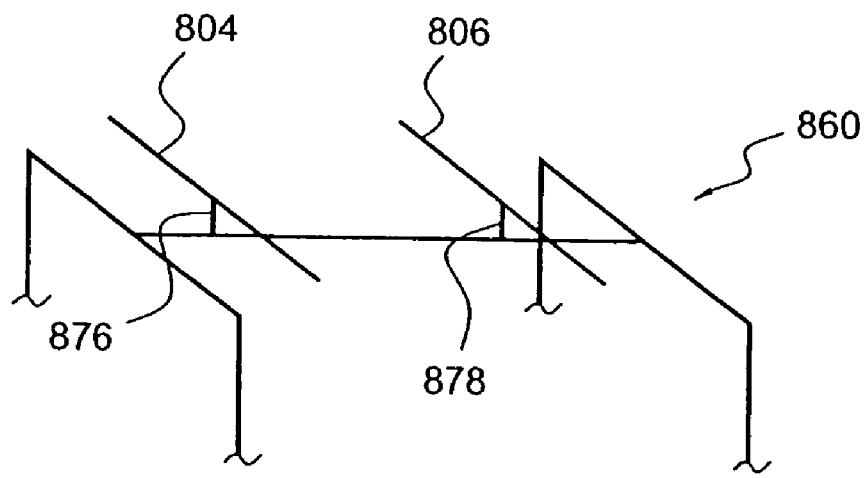
FIG. 29 is a another schematic perspective view of a liftable, nestable H-shaped oven rack according to the invention.
Figure 30:
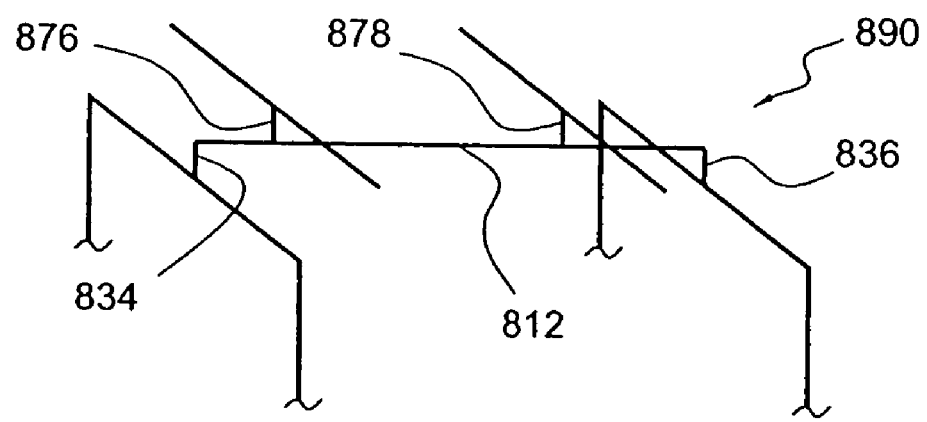
FIG. 30 is a further schematic perspective view of a liftable, nestable H-shaped oven rack according to the invention.

FIGS. 28-30 show perspective views of the various spacing element combinations described in connection with the generalized, plan view of H-shaped rack 800 of FIG. 27.

FIG. 28 shows an H-shaped rack 830 having spacer elements 834, 836 between left and right frames 816, 818, respectively.

FIG. 29 shows an H-shaped rack 860 having spacer elements 876, 878 between left and right lifting elements 804, 806, respectively.

FIG. 30 shows an H-shaped rack 890 having spacer elements 876, 878, between lifting element 804, 806, as well as further spacer elements 834, 836 between connector 812 and frames 816, and 818, respectively.

It is expected that the racks according to the invention may be made completely of stainless steel with or without the joints being riveted or welded or bolted, depending on the application.

It is likewise contemplated that the frame or rack be made of aluminum members, while the lifting elements be made of stainless steel or aluminum or both.

The wheels or casters may be oven casters, for example.

One or more of the left and right connector elements may extend at acute angles relative to one or both of the left and right frames. The acute angle may be less than 90°, less than about 60°, about 30°, or less than about 30°.

One or more of the left and right connector elements may be attached to a front portion of the respective upright member; or, for example, in the case of lower left end right connector elements may be connected to a front portion of the rack disposed inwardly of the upright member.

Single tray racks may be sized so as to have "footprint" to accommodate a single conventional tray having a "footprint" of 18"×26". Double side load racks may have a tray receiving region which accommodates two (2) conventional trays; i.e., a 36"×26" tray receiving region, or more.

While this invention has been described as having a preferred design, it is understood that it is capable of further modifications, of uses and/or adaptions of the invention following in general the principal of the invention and including such departures from the present disclosure as come within the known or customary practice in the art to which the invention pertains, and as may be applied to the central features herein before set forth, all fall within the scope of the invention and of the limits of the appended claims.

What is claimed is:

1. A liftable, nestable oven rack, comprising:

a) a left upright frame;

b) said left upright frame including a front post and a spaced apart rear post, and said front and rear posts being connected by an upper member and a lower member to form a generally rectangular frame;

c) a right upright frame spaced from said left upright frame, said right upright frame including a front post and a spaced apart rear post, and said front and rear posts being connected by an upper member and a lower member to form a generally rectangular frame;

d) an upper connector disposed between and connecting said left upright frame and said right upright frame;

e) said upper member of said left upright frame, said upper connector, and said upper member of said right upright frame defining an H-shaped frame which lies substantially in a first plane;

f) a lower connector disposed between said left upright frame and said right upright frame;

g) said lower member of said left upright frame, said lower connector, and said lower member of said right upright frame defining a Z-shaped frame which lies substantially in a second plane;

h) a plurality of rails provided on each of the left and right upright frames, each of the plurality of rails being configured for receiving and supporting an oven tray between the left and right upright frames, in use;

i) a lifting element disposed between said left and right upright frames;

j) said lifting element including two channels attached to said upper connector and extending generally parallel to said left and right upright frames, and the two channels including at least one L-channel;

k) a spacer provided between at least one of the left and right upright frames and the lifting element, the spacer being configured for locating the lifting element above an uppermost part of each of the at least one of the left and right upright frames to provide substantially free access between the lifting element and at least one of the left and right upright frames, in use; and l) said lifting element being configured for engaging with a lifting mechanism of a lifting device of an oven, in use.

2. A liftable, nestable oven rack as defined in claim 1, wherein:
a) the spacer is provided between the upper connector and at least one of the left and right upright frames.

3. A liftable, nestable oven rack as defined in claim 2, wherein:
a) the spacer includes a spacer element provided between the lifting element and the upper connector.

4. A liftable, nestable oven rack as defined in claim 3, wherein:
a) the spacer includes a further spacer element between the connector and the frame.

5. A liftable, nestable oven rack as defined in claim 1, wherein:
a) the two channels including at least one L-channel include a C-channel.

6. A liftable, nestable oven rack as defined in claim 1, wherein:
a) the two channels including at least one L-channel include a pair of spaced apart C-channels, each of which opens toward the other one of said pair of C-channels.

7. A liftable, nestable oven rack as defined in claim 1, wherein:
a) said upper connector is disposed adjacent an uppermost portion of said left and right upright frames.

8. A liftable, nestable oven rack as defined in claim 1, wherein:
a) the spacer includes a spacer element provided between the upper connector and each of the left and right upright frames.

9. A liftable, nestable oven rack as defined in claim 1, wherein:
a) the spacer includes a spacer element provided between the upper connector and the lifting element.

10. A liftable, nestable oven rack as defined in claim 1, wherein:
a) the two channels including at least one L-channel lifting element include a pair of spaced apart C-channels.

11. A liftable, nestable oven rack as defined in claim 1, wherein:
a) the two channels including at least one L-channel lifting element include a pair of spaced apart S-channels.

12. A liftable, nestable oven rack as defined in claim 1, wherein:
a) the two channels including at least one L-channel lifting element include a pair of spaced apart C-channels.

13. A liftable, nestable oven rack as defined in wherein:
a) the two channels including at least one L-channel lifting element include at least one C-channel.

14. A liftable, nestable oven rack, comprising:
a) a left upright frame;

b) said left upright frame including a front post and a spaced apart rear post, and said front and rear posts being connected by an upper member and a lower member to form a generally rectangular frame;

c) a right upright frame spaced from said left upright frame, said right upright frame including a front post and a spaced apart rear post, and said front and rear posts being connected by an upper member and a lower member to form a generally rectangular frame;

d) an upper connector disposed between and connecting said left upright frame and said right upright frame;

e) said upper member of said left upright frame, said upper connector, and said upper member of said right upright frame defining an H-shaped frame which lies substantially in a first plane;

f) a lower connector disposed between said left upright frame and said right upright frame;

g) said lower member of said left upright frame, said lower connector, and said lower member of said right upright frame defining a Z-shaped frame which lies substantially in a second plane;

h) a plurality of rails provided on each of the left and right upright frames, each of the plurality of rails being configured for receiving and supporting an oven tray between the left and right upright frames, in use;

i) a lifting element disposed on said liftable, nestable oven rack between said left and right upright frames;

j) said lifting element including two channels attached to said upper connector and extending generally parallel to said left and right upright frames, and the two channels including at least one L-channel;

k) a spacer provided between each of the left and right upright frames and the lifting element, the spacer being configured for locating the lifting element above an uppermost part of each of the left and right upright frames to provide substantially free access between the lifting element and each of the left and right upright frames, in use;

l) a further spacer provided between the upper connector and the lifting element; and m) said lifting element being configured for engaging with a lifting mechanism of a lifting device of an oven, in use.

15. A liftable, nestable oven rack as defined in claim 14, wherein:
   a) the two channels including at least one L-channel lifting element include a pair of spaced apart C-channels.

16. A liftable, nestable oven rack as defined in claim 14, wherein:
   a) the two channels including at least one L-channel lifting element include at least one C-channel.

* * * * *